Oct. 1, 1935.  E. E. WINKLEY ET AL  2,015,738
AREA MEASURING MACHINE
Filed Dec. 31, 1934  2 Sheets-Sheet 1
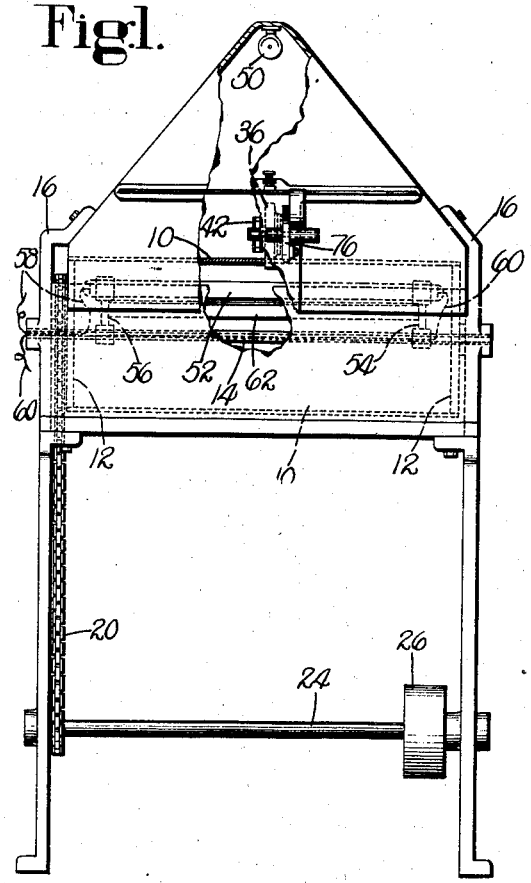
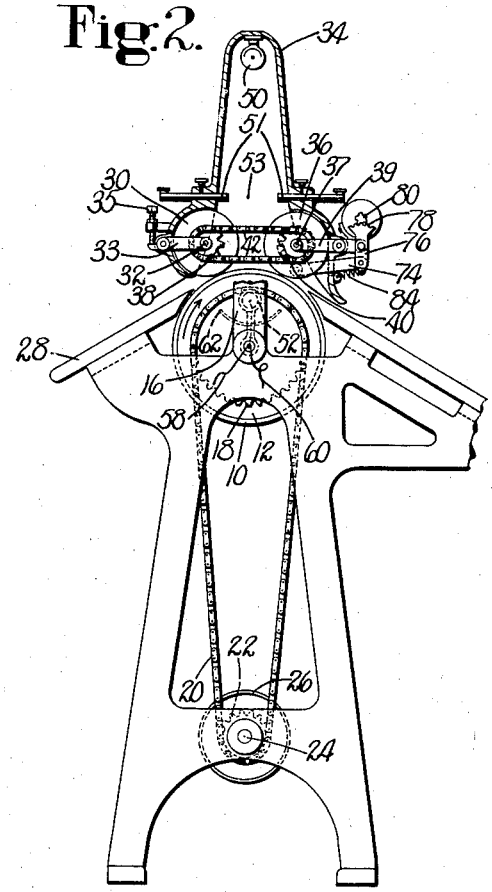
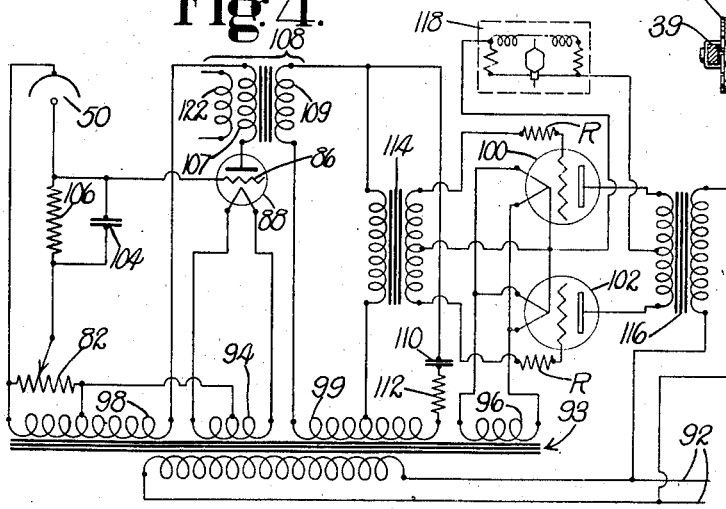

Oct. 1, 1935.  E. E. WINKLEY ET AL  2,015,738
AREA MEASURING MACHINE
Filed Dec. 31, 1934  2 Sheets-Sheet 2
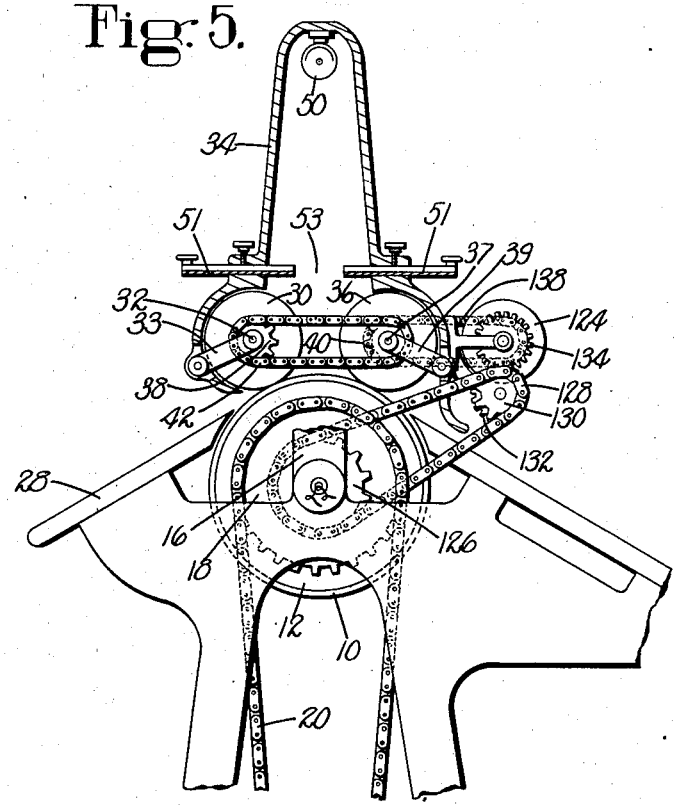
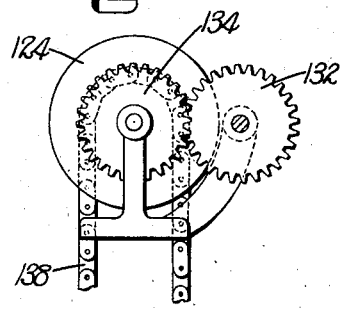
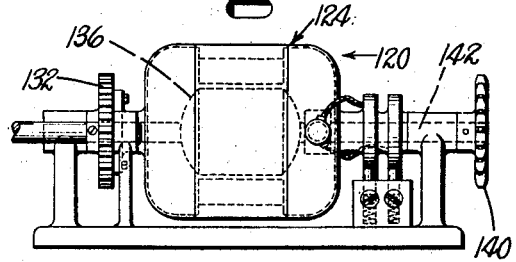
INVENTORS
Erastus E. Winkley
George J. Hart Jr.
By their Attorney
Harrison W. Davis Patented Oct. 1, 1935

2,015,738

UNITED STATES PATENT OFFICE.

2,015,738

AREA MEASURING MACHINE

Erastus E. Winkley and George T. Hart, Jr., Lynn, Mass., assignors to United Shoe Machinery Corporation, Paterson, N. J., a corporation of New Jersey Application December 31, 1934, Serial No. 760,056

17 Claims. (Cl. 33—123)

This invention relates to measuring machines. While the invention is illustrated as embodied in a machine for measuring the surface areas of hides and skins it is to be understood that the invention and various important features thereof may have other applications and uses.

In the measuring of hides and skins considerable difficulty is always encountered in securing accurate measurement of the superficial areas thereof due to the great irregularity of the contour of each hide or skin, no two hides or skins being exactly alike in this respect. Furthermore, hides and skins differ quite substantially in their thickness dimensions with the result that a work contacting member serving as part of a measuring means is likely to be variously affected by different hides and skins. It is an object of this invention to improve machines for use in area measuring operations upon hides and skins to secure greater accuracy in the measuring operations. A further object of the invention is to provide a measuring machine of general utility in the measuring of pieces of work capable of maintaining production while securing the required degree of accuracy in individual measuring operations.

To these ends and in accordance with an important feature of the invention there is provided in the illustrated machine an integrating electric meter in a circuit controlled by a radiation-sensitive device in the form of a photoelectric cell between which are a source of radiation pieces of work are passed in area measuring operations, in an organization wherein means is provided for feeding the pieces of work at a predetermined speed between said cell and the source of radiation, the arrangement being further such that no current passes through the meter when no piece of work is in place between the source of radiation and the photo-electric cell.

By this means an accurate measurement of the area of pieces of work, of regular or irregular contour, may be obtained since the photo-electric cell is sensitive to changes in the amount of radiation reaching it from the source of such radiation irrespective of the particular shape or contour of the article being measured. With each decrease of radiation reaching the photo-electric cell there is an increase in the current passing through the integrating electric meter, and with each increase in radiation reaching said cell a corresponding decrease in the current passing through said meter. Since the meter is, as described, an electric integrating meter, it records the amount of current passing therethrough from the time that the piece of work begins its passage through the space between the photo-electric cell and the source of radiation until the said piece of work leaves said space. Through the use of the proper test sheets, the meter may be readily calibrated to indicate the measurement of the pieces of work in units of area. Hence there is provided by this improved construction a relatively simple and inexpensive apparatus which is at the same time sufficiently accurate in the measurement of pieces of work of regular or irregular contour and irrespective of the thickness dimensions thereof.

In the illustrated embodiment of the invention the work piece passes over a long narrow slot, whose length is greater than the width of the work piece, and whose width is small as compared to the length of the work piece. The work piece is thus, in effect, divided into a series of narrow parallel strips, and the illumination thrown on the photo-electric cell is proportional to the length of the strip. These strips being of equal width, due to the uniform velocity of feed of the work, the area of the work is proportional to the sum of the length of the strips, and the reading of the integrating meter is likewise proportional to the area. In view of the finite width of the strip, the above statement is only approximately true, but is sufficiently accurate for the work in hand.

Conveniently, an amplifier tube is provided under control of the photo-electric cell, the connection between the two being such that, as light incident on the photo-electric cell decreases, due to increasing area of the work portions, the current passed by the amplifier tube increases. Preferably, electrical adjustment of the amplifier and of the necessary electrical devices, hereinafter described, between it and the integrating electric meter is such that, when the photo cell is at full illumination, no current will pass in the meter or indicator. Furthermore, as the illumination on the photo-electric cell is decreased, the meter will start to record and the integrated current passing through the meter will be proportional to the area passed through the machine. The meter may, accordingly, be calibrated to record in units of area, rather than in electrical units. After the meter (or area) has been read, the meter may conveniently be set at zero, preparatory to measuring the next skin or lot of skins.

In measuring operations upon certain kinds of skins, as for instance, kid skins, it is commonly necessary to retard somewhat the speed of each skin in order to secure measurement of the skin in its fully extended condition. By retarding the middle portion of the skin while the fuller marginal portions thereof are unrestrained, said marginal portions are permitted to travel faster than the middle portion to secure measurement of said marginal portions in extended condition. This retardation of the work piece would cause the meter reading to be too large. Means is, therefore, provided for varying the amount of current in the meter circuit in accordance with the slower average and travel of the work through the measuring chamber. In a preferred construction, a roll is arranged to contact with the upper surface of the piece of work to move at the same speed as the work, said work contacting member being connected to one element of a generator while another element of the generator is connected to a member moving at a predetermined speed and operative to feed the work at that speed through the measuring chamber, unless the work be retarded by the operator, the generator being operative to produce a current upon relative movement of the two elements mentioned. This preferred construction further embodies means arranged in circuit with the generator to vary the current in the meter circuit in accordance with changes in the rate of movement of the piece of work with respect to said work feeding member.

These and other important features of the invention and novel combinations of parts will now be described in detail in the specification and then pointed out more particularly in the appended claims.

In the drawings,

Fig. 1 is a view in front elevation and partly in section illustrating one embodiment of the invention;

Fig. 2 is an end view, partly in section, of the apparatus shown in Fig. 1;

Fig. 3 is a detail view of means for operating a potentiometer;

Fig. 4 is a diagram of electrical circuits which may be employed as a part of the measuring and indicating means;

Fig. 5 is a view similar to Fig. 2 illustrating a modification;

Fig. 6 is a more or less diagrammatic view of a generator employed to compensate for delayed travel of the work; and Fig. 7 is a detail of driving means for the generator of Fig. 6.

In the illustrated construction, which is specially designed for the measurement of skins and other light leathers, there is provided a work support in the form of a cylinder 10 made of a transparent substance such as glass. The cylinder 10 serves not only as a support for the work during measurement thereof but also as a work feeding means. As shown, the cylinder 10 is provided with end pieces 12 each of which provides a bearing for the rotation of the cylinder 10 upon a shaft 14 fixedly carried at its ends in the upright frame members 16 of the machine. Secured to one end piece 12 of the cylinder 10 is a sprocket wheel 18 about which passes a sprocket chain 20 arranged to pass also around a sprocket wheel 22 on a shaft 24 mounted rotatably in the lower part of the frame, the shaft 24 carrying a pulley 26 which may be driven from any suitable source of power.

At the front of the machine there is provided a feeding-in table 28 over which a piece of work such as a skin may be pushed until it engages between the cylinder 10 and a presser roll 30 mounted upon a stub shaft 32 journaled in bearings provided by a bifurcated member 33 pivoted in a frame or hood member 34. The bifurcated member 33 (Fig. 2) is provided with a short arm with which contacts an adjustable screw 35 adapted to adjust the presser roll 30 with respect to the cylinder 10. Preferably, and as shown, a second presser roll 36 is similarly mounted on a shaft 37 carried by a bifurcated member 39 pivoted in the hood 34, to assist in feeding the work into and out of the machine. As illustrated the presser rolls 30 and 36 have associated therewith sprocket wheels 38 and 40 arranged to be connected by a sprocket chain 42, the arrangement being such that the rolls 30 and 36 are connected to rotate together at the same speed. Preferably the presser rolls 30 and 36 are spaced a slight distance from the cylinder 10, the spacing being so small that introduction of the thinnest piece of leather between the rolls 30, 36 and the cylinder 10 will cause rotation of the rolls which, by pressing the work upon the cylinder 10 are themselves driven by the work at the same linear speed as that of the cylinder 10. It will be understood, however, that the rolls may be in contact with cylinder 10.

As part of means for performing measuring operations upon pieces of work passing over the transparent cylinder 10, there is provided a radiation-sensitive device in the form of a photoelectric cell 50 mounted at the top of the chamber furnished by the hood 34. The lower end of the hood or chamber 34 is open and thus provides a long narrow slot through which light may pass to the cell 50. Preferably and as shown, two adjustable plates 51 are provided in the hood 34, so that light from a lamp 52 may pass through a slot 53 of controllable width. Mounted within the transparent cylinder 10 is the lamp 52 (Fig. 1) supported by bearing members 54, 56 fixedly carried by the stationary shaft 14, the lamp 52 and its bearings 54, 56 being thus held stationary in space while the cylinder 10 revolves. As shown, the shaft 14 is hollow so that wires 58, 60 may be directed therethrough and connected with the opposite ends of the lamp 52 to provide the current necessary for the lighting of the lamp. Conveniently, a reflector 62 (Fig. 2) is provided below the lamp 52 to direct the light from the lamp in an upward direction toward the photo-electric cell 50.

It will be understood that, upon passing pieces of work of varying contour over the cylinder 10, the amount of light reaching the photo-electric cell 50 from the lamp 52 is varied continuously in accordance with variations in the width dimensions of each piece of work. Hence the photo-cell will vary the current in a circuit containing an indicator or meter of the integrating type which will be calibrated to measure in units of area. Since the integrated amount of current passing through the meter depends not only on the width of the constantly changing bands or strips of the work passing over the cylinder 10 but also upon the time involved, as determined by the speed of travel of the piece of work, it is clear that the simplest construction is one in which the work is moved at an unvarying speed over the cylinder 10.

As before stated it is common practice in the measurement of certain skins, kid skins, for example, to retard the middle portion of each skin while permitting the marginal portions thereof to travel along with the feeding means, this being to insure that the full marginal portions of the skin will be suitably measured. Upon holding back or retarding the movement of the middle portion of the skin a corresponding change must be made in the electrical current passing to the indicating meter. The apparatus for doing this will be described later. In one embodiment of the invention, a frictional member 70 (Fig. 3) is mounted upon the shaft 37 of the feed roll 36 and is pressed against the feed roll 36 by a spring 72. The tension of spring 72 is varied by the speed of turning of the roll 36 due to the operation of two governor weights 73 and 73a. As shown, the friction member 70 has a downwardly projecting portion to which is pivoted a link 74, which link is pivotally connected at its other end to a lever 76 (Fig. 2) having at its upper end a toothed segment 78 in mesh with a pinion 80 connected to a potentiometer indicated at 82 (Fig. 4). The tendency of the friction member 70 to revolve with the wheel 36 varies with the speed of the latter and is resisted by a spring 84 (Fig. 2). As the speed of the wheel 36 is varied, by holding back on the work, the link 74 will assume different positions with the result that the pinion 80 will be rotated intermittently from right to left or from left to right in such manner as to alter the adjustment of the potentiometer 82, thereby introducing a speed characteristic into the current of the photo-electric cell.

In Fig. 4 of the drawings there is shown an arrangement of electrical circuits between the photo-electric cell and the integrating meter. In view of the rectifying action of the usual amplifier tube and a like action in photo-electric cells, these circuits may be operated from a single phase alternating current source. The mains from such a source are indicated at 92. These mains feed the primary of a transformer 93, which transformer has four secondaries, and the mains also feed the primary of a transformer 116. The four secondaries of the first-mentioned transformer are: 98 which feeds the photo-electric cell 50, and also feeds the plate of an amplifier tube 88, 94 which feeds the filament of the amplifier tube 88, 99 which feeds both the alternating current winding 109 of a saturable reactor 108 and the primary of a transformer 114, and 96 which feeds the filaments of a pair of Thyratrons 100 and 102. The secondary of the transformer 114 feeds alternating voltage to the grids of the pair of Thyratrons 100 and 102. The secondary of the transformer 116 feeds plate current to the pair of Thyratrons. The combined (full wave rectified) plate current from the pair of Thyratrons passes through the integrating meter 118 and is measured thereby.

Referring to the secondary 98, a potentiometer 82 is connected across one portion thereof and the arm of this potentiometer is connected, through a resistance 106, by-passed by a condenser 104, to the anode of the photo-electric cell 50. The cathode of the photo-electric cell 50 is connected to the end of the secondary 98 to which the potentiometer 82 is also connected. The opposite end of the secondary 98 is connected, through the direct current winding 107 of the saturable reactor 108, to the plate of the amplifier tube 88. The plate return of the amplifier 88 is through its filament to the mid-point of the secondary 94 and thence to the intermediate point of the secondary 98 to which the potentiometer 82 is connected. The grid 86 of the amplifier tube 88 is connected directly to the anode of the photo-electric cell 50.

The secondary 99 is connected to a bridge circuit by which the phase of the grids of the Thyratrons 101, 102 is shifted. In one arm of this bridge is the alternating current winding 109 of the saturable reactor 108 and in the other arm is a condenser 110 and a non-inductive resistance 112 in series with each other. The junction joint of these two arms is connected, through the primary of the transformer 114, to the mid-point of the secondary 99. As the direct current in the winding 107 of the saturable reactor varies, the inductance of the alternating current winding 109 is varied and this shifts the phase in the primary winding of the transformer 114 and, thus, the phase in the secondary of this transformer is also shifted. As the opposite ends of this secondary are connected to the grids of the Thyratrons, through the protective resistances R, the phase of the grid voltage is likewise shifted to change that point in each positive half of the cycle at which the grid voltage reaches that critical voltage which permits plate current to start flowing, thus lengthening or shortening the time in each cycle during which the plate current will flow. The mid-point of the secondary of the transformer 114 is connected to the mid-point of the filaments (or cathodes) of the Thyratrons 100 and 102 for a grid return. The plates of the Thyratrons are connected to the ends of the secondary of the transformer 116 and the mid-point of this secondary is connected, through the integrating meter 118, to the above-mentioned mid-point of the filaments (or cathodes) of the Thyratrons for the plate return.

The constants of these inter-connected circuits including the potentiometer 82 are chosen and adjusted so that, when the photo-electric cell 50 is fully illuminated, no current will flow in the integrating meter 118 and so that the current that flows, when the illumination on the cell is decreased, will increase in proportion to such decrease.

The operation of the circuits is summarized in the following numbered paragraphs. In each of these paragraphs a change of condition is stated. The change, in each instance, is the result of the change described in the preceding paragraph and causes the change described in the succeeding paragraphs.

Decrease of light on photo-electric cell 50.
Increase of resistance of photo-electric cell 50.
Decrease of current in resistance 106.
Decrease of voltage drop across resistance 106.
Decrease of negative grid voltage of amplifier tube 88.
Increase of half-wave rectified current in plate circuit of 88 and in winding 107 of saturable reactor 108.
Decrease of inductance of winding 109 of saturable reactor 108.
Shift of phase in Thyratron grid transformer 114.
Lengthened period in each positive half cycle during which half wave rectified current will flow in each Thyratron.
Increase of output of full wave rectified current, in each cycle, in the plate return circuit of the Thyratrons.
Increase of current in integrating meter 118.

As heretofore stated, the amount of illumination reaching the photo-cell 50 depends upon the varying width of the skin or other piece of leather being passed through the measuring chamber at any given instant. If the speed of travel of the work is known and the current passed by the Thyratron tubes is proportional to the width of the work (or in inverse proportion to the amount of illumination reaching the photo-cell) a reading can be taken which will represent area. In other words, the indicating meter 118 translates the amount of current passed by the Thyratron tubes 100, 102, and the time during which the current is flowing, into an area reading, provided, of course, that the meter has been calibrated to read in units of area.

Since the operator may find it advantageous to retard the central portion of a skin by holding it back while marginal portions of the skin continue to move with the cylinder 10, it is essential to make a corresponding correction since a change in the speed of travel of the work changes the time during which the current is flowing and this in turn would change the reading of the indicator. As before stated this correction may be accomplished by altering the adjustment of the potentiometer 82.

In place of the mechanical friction means, shown in Fig. 3 of the drawings, there may be substituted, if desired, an electrical speed compensating device consisting of a small generator 120 (Fig. 6) connected to a winding 122 of the saturable reactor 108. The field 124 of the generator 120 revolves in relation to the linear speed of the cylinder 10, being driven from the cylinder 10, through sprocket 126, chain 128, sprocket 130, and gears 132, 134 (Figs. 5 and 6). An armature 136 is similarly rotated in relation to the linear speed of the presser rolls 30, 36 above the cylinder 10, the armature being driven by a chain 138 passing around a sprocket on the shaft 37 of the presser roll 36 and also around a sprocket 140 on the armature shaft 142. With this arrangement it is obvious that when the cylinder 10 and the presser rolls 30, 36 are turning at the same linear speed there is no relative motion between the field 124 and the armature 136 and consequently no current is generated. When the rolls 30, 36 revolve more slowly than the cylinder 10, that is, when there is differential velocity of the work and of the work supporting and feeding cylinder 10, a current is generated (flowing in the winding 122 of the saturable reactor 108) which will reduce the effect of the phase changing direct current in the plate circuit of the amplifier tube 88. Thus the speed of the skin, if slower than the linear speed of the cylinder 10, causes a reduced current to flow in the metered circuit of the Thyratron tubes, which reduction is proportional to such differences of speed. From a broad viewpoint, the generator 120 with its gear connections to the cylinder 10 and to the presser roll 36 constitutes a differential mechanism.

It will be understood that the particular circuits, tubes and electrical instrumentalities above described constitute parts of a construction which is illustrative only. The construction is arranged to be controlled by illumination of a photo-electric cell in which the output is metered, so that the product of time and current may be calibrated to indicate area of the pieces of work undergoing measurement. Furthermore, the meter may be returned to register zero at the end of a measuring operation.

In the operation of the machine, a skin or other piece of leather is introduced from the left in Fig. 2 between the cylinder 10 and the presser roll 30, the presser roll 30 pressing the work down upon the cylinder 10 so that the work and the roll 30 move at the linear speed of the cylinder 10. If the operator does not attempt to retard the forward movement of any part of the piece of work, the meter indicates the amount of current passed by the Thyratron tubes 100, 102 in the time during which the current is flowing in the passage of the piece of work. If the piece of work is retarded in its movement so that it moves more slowly than the cylinder 10 correction is made for the change in speed (and hence for the change in time) through adjustments effected by the potentiometer or its equivalent compensating device, so that the correct measurement will be shown by the indicating meter.

Having described our invention, what we claim as new and desire to secure by Letters Patent of the United States is:

1. In a machine for measuring the area of a piece of work, a radiation-sensitive device progressively responsive to the width dimension of said piece of work as it is fed through the machine, an electrical circuit comprising said device, means for feeding said piece of work through the machine, and an integrating electric meter having connections with said circuit which render said meter responsive to said device.

2. In a machine for measuring the area of pieces of work, the combination of means for feeding a piece of work through the machine, a radiation-sensitive device in an electrical circuit and responsive to variations in the area of successively presented portions of said piece of work, and an integrating electric meter having connections with the circuit of said device which render said meter responsive to the integrated area of said piece of work.

3. In a machine for measuring the area of pieces of work, a radiation-sensitive device, a source of radiation spaced from said device, means for feeding the piece of work through the space between said source of radiation and said device at a predetermined speed, variations in the current passing through said radiation-sensitive device being dependent on variations in the amount of radiation reaching said device due to variations in the contour of the work piece, and an integrating electric meter in a circuit controlled by said device, said meter being calibrated as an indicator to indicate measurements in units of area.

4. In a machine for measuring the area of pieces of work, a photo-electric cell, a source of light spaced from said cell, means for feeding a piece of work through the space between the source of light and the photo-electric cell at a predetermined speed, variations in the current passing through the circuit of the photo-electric cell being dependent on variations in the amount of light reaching said cell due to variations in the contour of the work piece, and an integrating electric meter in a circuit controlled by said photo-electric cell, said meter being calibrated to indicate measurements in units of area, and the circuits being so constructed and arranged that when the photo-cell is at full illumination, no current will flow through the meter.

5. In a machine for measuring the area of pieces of work, a photo-electric cell, a source of light spaced from said cell, means for feeding a piece of work through the space between said source of light and said cell at a predetermined speed, variations in the current passing through said photo-cell being dependent on variations in the illumination reaching said cell due to variations in the contour of the work piece, and an integrating electric meter in a circuit controlled by the photo-cell, said meter being calibrated as an indicator to indicate measurements in units of area.

6. In an area measuring machine, a photo-electric cell, a source of light spaced from said cell, means for feeding successive portions of a piece of work through the space between said source of light and said cell at a predetermined speed, variations in the current passing through the photo-electric cell circuit being substantially proportional to the variations in the areas of the said portions, an amplifier tube in a circuit controlled by the photo-cell, and an integrating electric meter in a circuit controlled by the amplifier, said meter being calibrated as an indicator to indicate measurements in units of area, and the circuits being so constructed and arranged that, when the photo-cell is at full illumination, no current will flow through the meter.

7. In an area measuring machine, a photo-electric cell, a lamp serving as a source of light spaced with respect to said cell, means for feeding successive portions of a piece of work through the space between said lamp and said cell at a predetermined speed, the current passing through said photo-electric cell being dependent on the area of that work piece portion which is then between the cell and the lamp, an amplifier tube connected to be controlled by the photo-electric cell, the connection being such that as light incident on the photo-electric cell decreases, the current passed by the amplifier tube increases, and an integrating meter in a circuit controlled by the amplifier tube, said meter being calibrated as an indicator to indicate measurements in units of area.

8. In a machine for measuring pieces of work of irregular contour, a photo-electric cell, a lamp spaced with respect to said cell, a chamber enclosing the photo-cell, said chamber having an opening or slot therein of a length greater than the width dimension of the largest pieces of work to be measured, and the width of the opening or slot being much less than its length, so that, upon passing a piece of work across the slot and between the lamp and photo-electric cell, only a narrow band or strip of the work is interposed at any given instant between the lamp and the cell, means to feed the piece of work at a predetermined speed across the slot, whereby the length of the band or strip of work continuously varies the light passing through the slot to the photo-electric cell during travel of the work across the slot, and an integrating electric meter in a circuit controlled by the photo-electric cell, said meter being calibrated as an indicator to indicate measurements in units of area.

9. In an area measuring machine, a photo-electric cell, a lamp serving as a source of light spaced from said cell, a chamber, having a slot-like opening, enclosing the photo-electric cell, the lamp being positioned to project light toward and upon the cell through the opening, a cylinder of transparent material enclosing said lamp, means to rotate said cylinder at a predetermined speed, means including said cylinder to feed successive portions of a piece of work over the opening between the lamp and the photo-electric cell whereby the current in the cell circuit is varied in accordance with the width of the part of the work that is over the opening, and an integrating electric meter in a circuit controlled by the photo-electric cell, said meter being calibrated as an indicator to indicate the area of each piece of work passing over the surface of said cylinder.

10. In a machine for measuring the area of pieces of work of irregular contour, a photo-electric cell, a chamber containing said cell, a lamp serving as a source of light located to project light upon said cell, means for feeding successive portions of a piece of work at a predetermined speed between the lamp and the photo-electric cell whereby the amount of light reaching the cell is varied momentarily causing corresponding changes in the current passing through said photo-electric cell, an integrating electric meter in a circuit controlled by the photo-electric cell, said meter being calibrated as an indicator to indicate measurement in units of area, and means controlled by the work to vary the current in the meter circuit in accordance with changes in the rate of movement of the work with respect to said work feeding means, whereby correction is made for changes in the speed of the work and accurate measurement of the work obtained.

11. In an area measuring machine, a photo-electric cell, a chamber containing said cell, a lamp serving as a source of light located to project light upon said cell, a cylinder of transparent material surrounding said lamp, means rotating the cylinder at a predetermined speed, a member arranged to co-operate with said cylinder for moving a piece of work between the lamp and the photo-electric cell, an integrating electric meter in a circuit controlled by said cell and calibrated as an indicator to indicate measurements in units of area, and means controlled by the work to vary the current in the circuit of the meter in accordance with changes in the rate of movement of the work with respect to that of said cylinder.

12. In an area measuring machine, a photo-electric cell, a chamber containing said cell and having an opening in the wall thereof opposite to said cell, a lamp serving as a source of light located adjacent to said opening to project light upon said cell, a cylinder of transparent material surrounding said lamp, means rotating the cylinder at a predetermined speed, said cylinder serving as means for moving a piece of work between the lamp and the photo-cell, an integrating electric meter in a circuit controlled by the photo-electric cell, and calibrated to indicate measurements in units of area, a presser roll arranged to contact with the piece of work passing over said cylinder, the roll being driven by the work so that it moves at the same rate as the latter, and means operatively connected to said roll for varying the current in the meter circuit in accordance with the rate of movement of the work upon changing the speed of the work from that of the cylinder.

13. In an area measuring machine, a photo-electric cell, a chamber enclosing said cell and having an open end, a lamp serving as a source of light located adjacent to said open end of the chamber to project light upon said cell, a work supporting member movable at a predetermined speed to move successive portions of a piece of work along over the open end of the chamber and between the lamp and the photo-electric cell, an integrating electric meter in a circuit controlled by said cell, said meter being calibrated to indicate measurements in units of area, a roll arranged to contact with the piece of work moving along with said work supporting member, the roll being driven by the work so that it moves at the same rate as the latter, and means connected to said roll and to said work supporting member to vary the current in said meter circuit in accordance with the differential velocity of the work and of the work supporting member.

14. In an area measuring machine, a photo-electric cell, a chamber containing said cell and having an open end, a lamp serving as a source of light located adjacent to said open end of the chamber to project light upon said cell, a work supporting member movable at a predetermined speed to move successive portions of the piece of work along over the open end of the chamber and between the lamp and the photo-electric cell, an integrating electric meter in a circuit controlled by said cell, said meter being calibrated to indicate measurements in units of area, a roll arranged to be driven at the same rate as the piece of work fed by said work supporting member, and means comprising a potentiometer controlled by said roll for varying the current in said meter circuit in accordance with changes in the rate of movement of the piece of work with respect to said work supporting member.

15. In an area measuring machine, a photo-electric cell, a chamber enclosing said cell and having an open end, a lamp serving as a source of light located adjacent to said open end of the chamber to project light upon said cell, a cylinder of transparent material surrounding said lamp, means rotating the cylinder at a predetermined speed, said cylinder serving as means for moving successive portions of a piece of work along over the open end of the chamber and between the lamp and the photo-electric cell, an integrating electric meter in a circuit controlled by said cell, said meter being calibrated to indicate measurements in units of area, a plurality of presser rolls arranged to contact with the piece of work passing over said cylinder to assist in feeding the work, the rolls being driven by the work so that they move at the same rate as the latter, a potentiometer in the photo-electric cell circuit, and means comprising differential mechanism connected to said cylinder and to said rolls and arranged to adjust said potentiometer for varying the current in said meter circuit in accordance with changes in the rate of movement of the piece of work with respect to said cylinder.

16. In an area measuring machine, a photo-electric cell, a chamber containing said cell and having an open end, a lamp serving as a source of light located adjacent to said open end in the chamber to project light upon said cell, a work supporting member movable at a predetermined speed to move successive portions of a piece of work along over the open end of the chamber and between the lamp and the photo-electric cell, an integrating electric meter in a circuit controlled by the photo-electric cell, said meter being calibrated to indicate measurements in units of area, a roll arranged to contact with the piece of work moving along with said work-supporting member, the roll being driven by the work so that it moves at the same rate as the latter, a generator having an element arranged to be driven by said work contacting roll and another element arranged to be driven by said work supporting member, and means arranged in circuit with said generator to vary the current in said meter circuit in accordance with changes in the rate of movement of the piece of work with respect to said work supporting member.

17. In an area measuring machine, a photo-electric cell, a chamber containing said cell and having an open end, a lamp serving as a source of light located adjacent to said open end in the chamber to project light upon said cell, a cylinder of transparent material surrounding said lamp, means rotating the cylinder at a predetermined speed, said cylinder serving as means for moving successive portions of a piece of work along over the open end of the chamber and between the lamp and the photo-electric cell, an integrating electric meter in a circuit controlled by said cell, said meter being calibrated to indicate measurements in units of area, a roll arranged to contact with the piece of work passing over said cylinder, the roll being driven by the work so that it moves at the same rate as the latter, a generator having an element arranged to be driven by said work contacting roll and another element arranged to be driven by said cylinder, and means arranged in circuit with said generator to vary the current in said meter circuit in accordance with changes in the rate of movement of the piece of work with respect to said cylinder.

ERASTUS E. WINKLEY.
GEORGE T. HART, JR.